April 30, 1957
W. M. DOW
2,790,505
METHODS OF AND MEANS FOR DEHYDRATING AND PROCESSING FLUID STREAMS
Filed Aug. 2, 1954
5 Sheets-Sheet 1
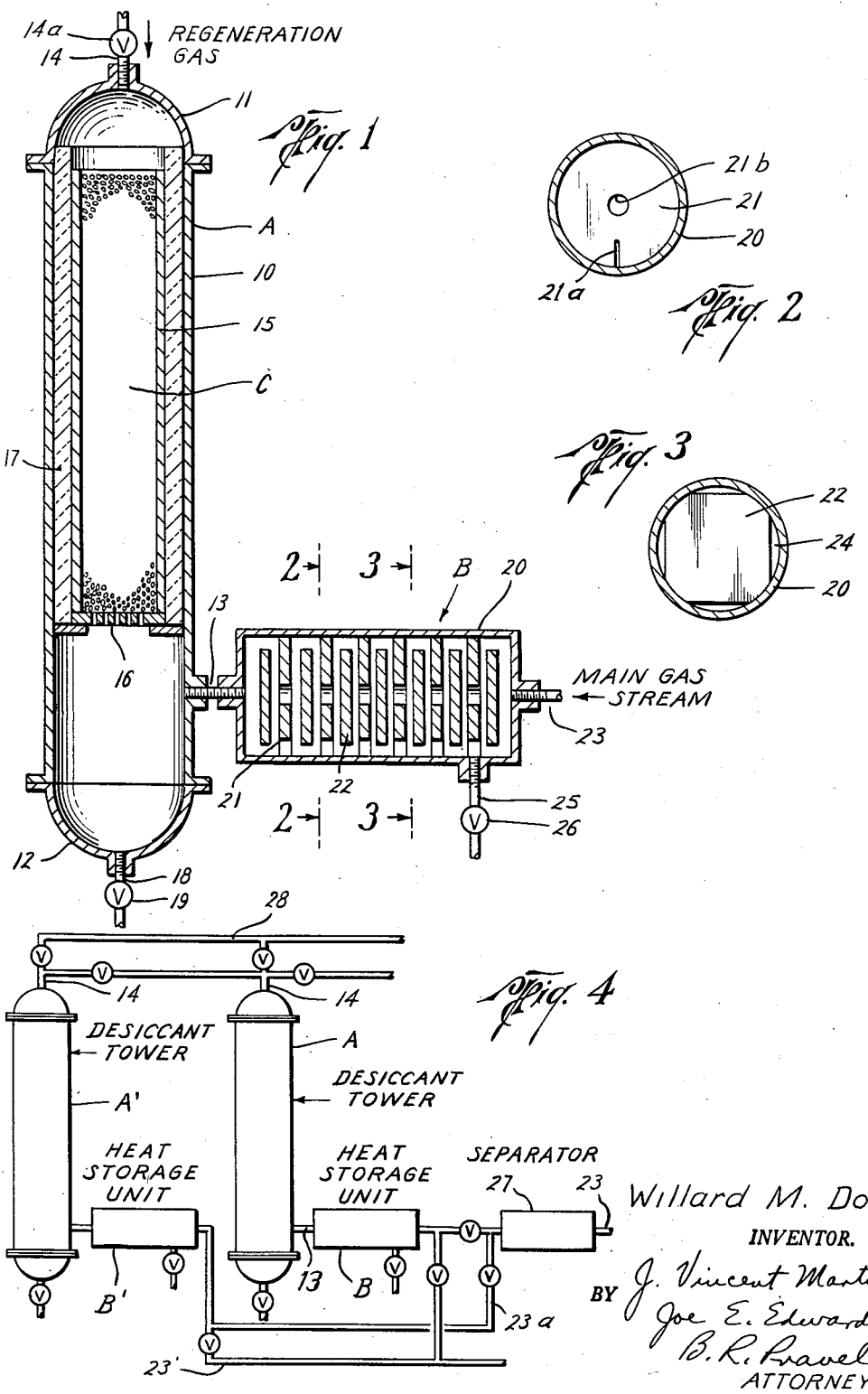
Willard M. Dow
INVENTOR.
BY J. Vincent Martin
Joe E. Edwards
B. R. Pravel
ATTORNEYS

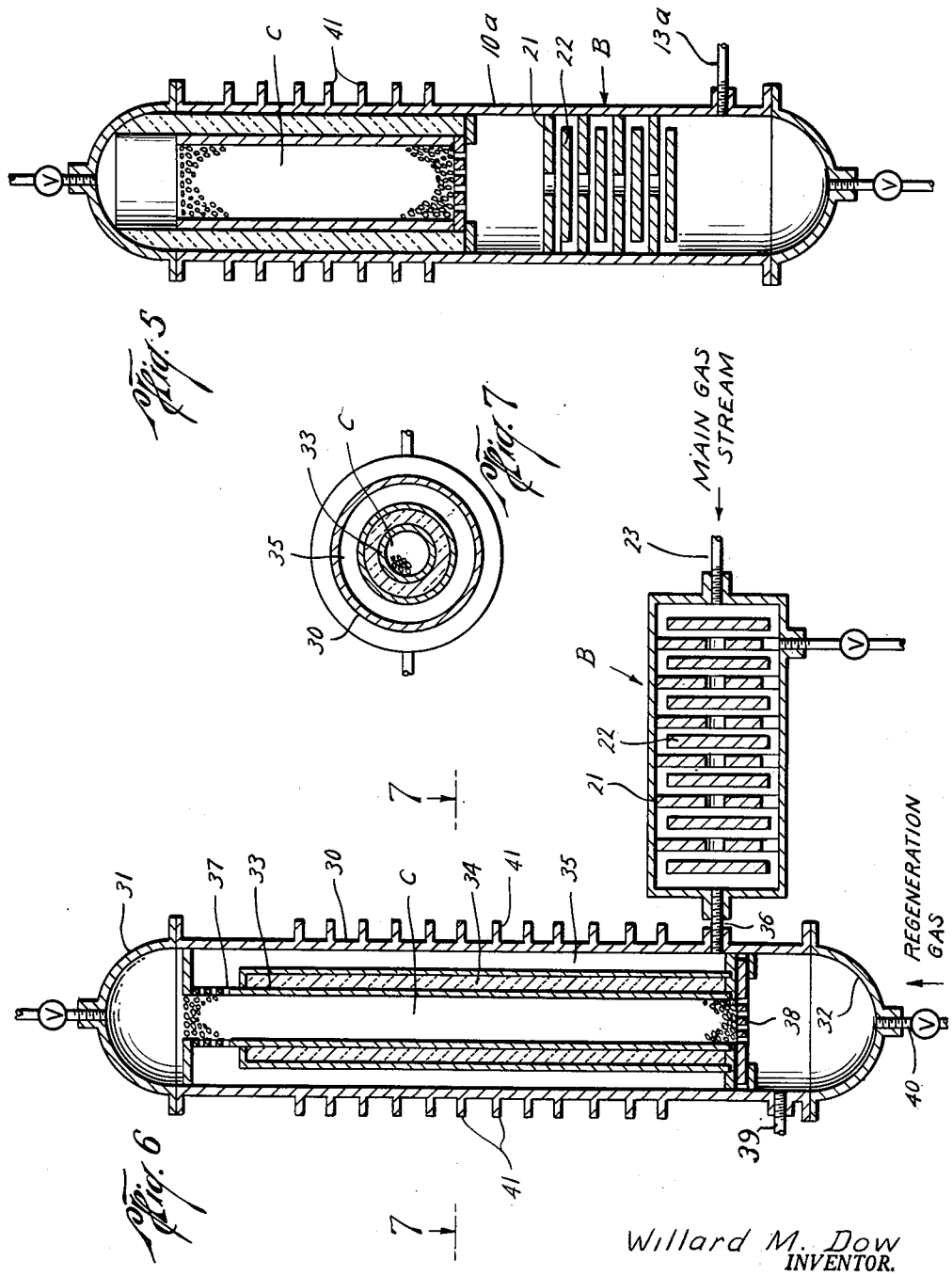

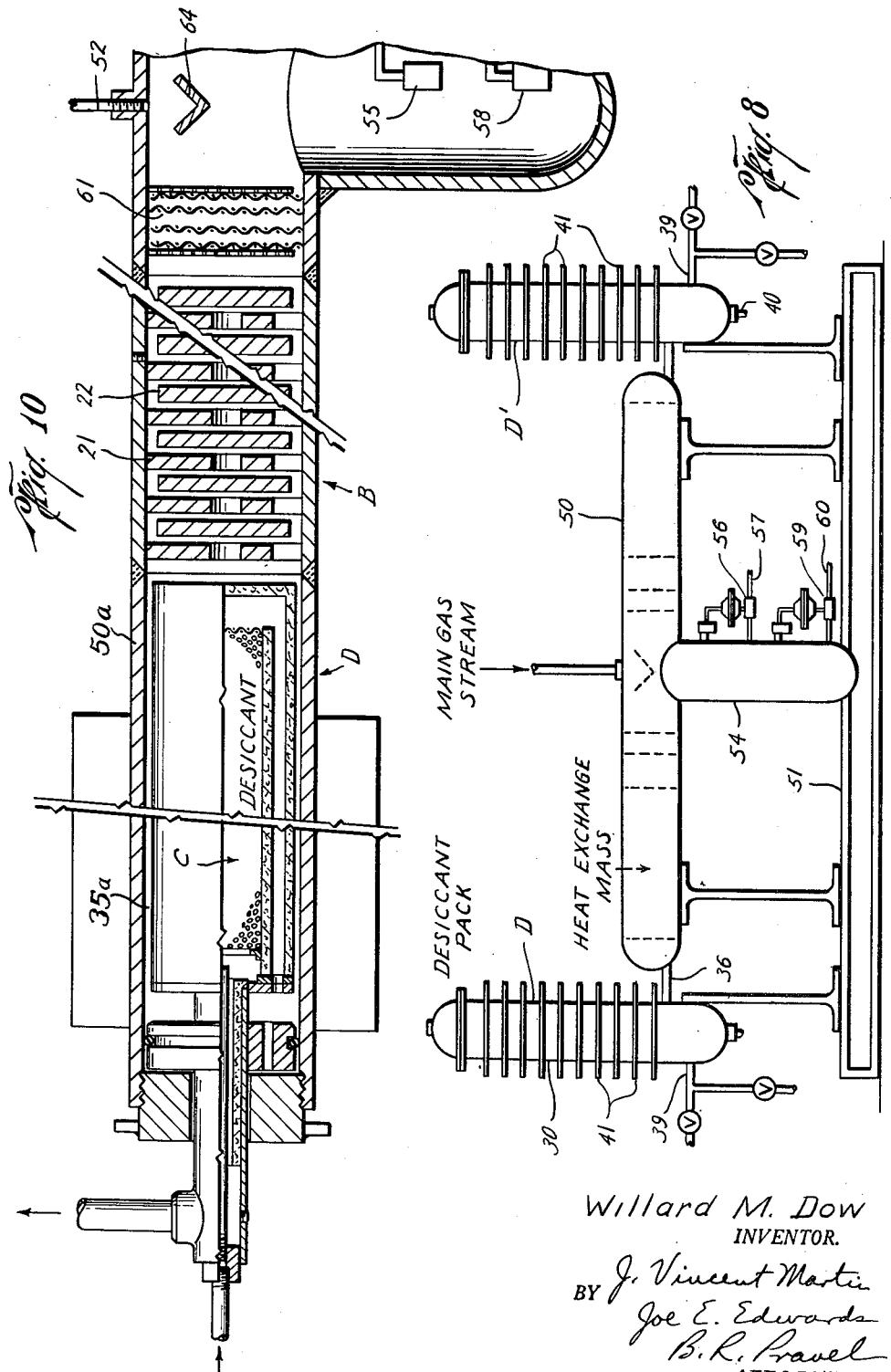

April 30, 1957
W. M. DOW
2,790,505
METHODS OF AND MEANS FOR DEHYDRATING
AND PROCESSING FLUID STREAMS
Filed Aug. 2, 1954
5 Sheets-Sheet 4
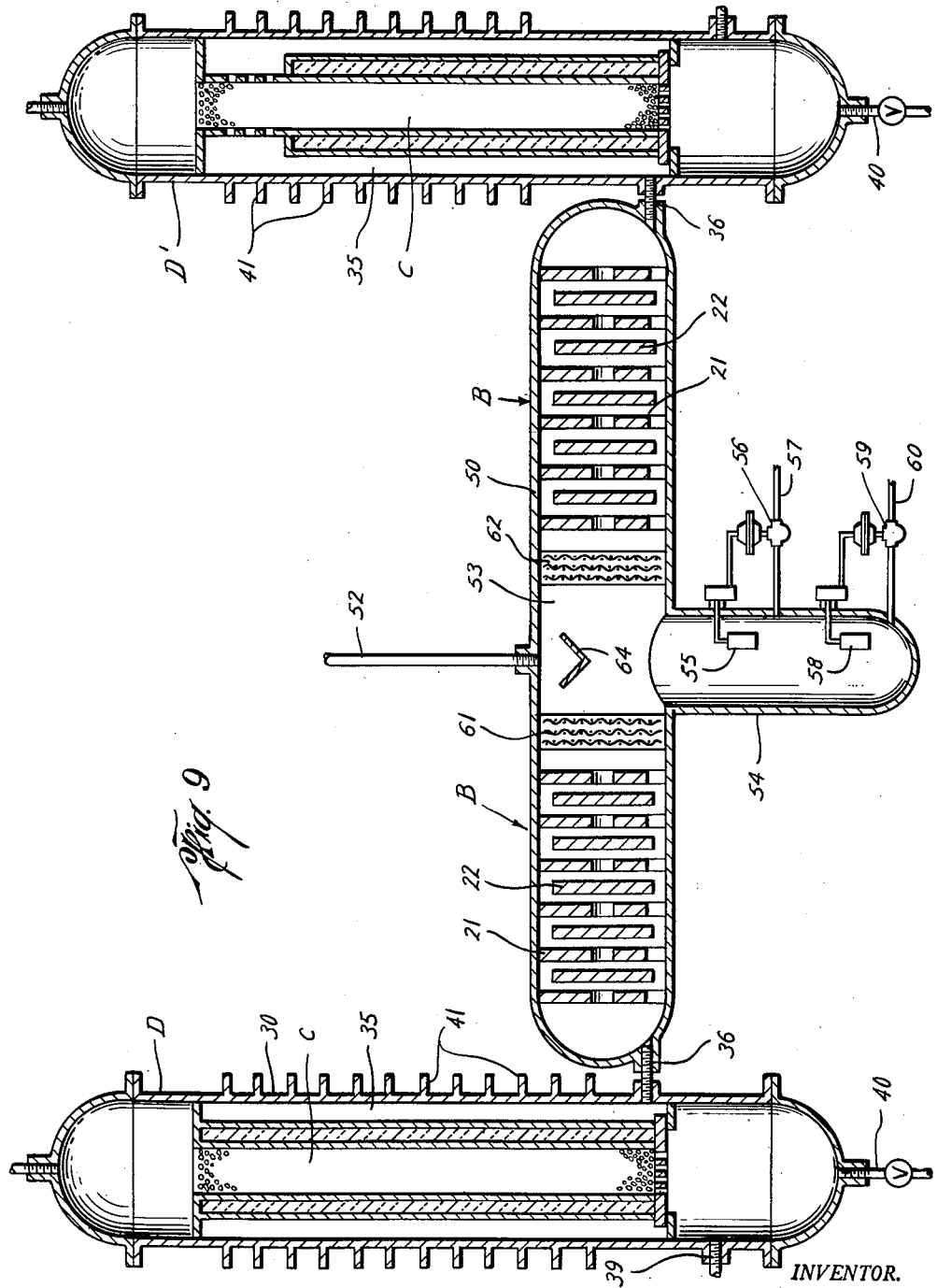

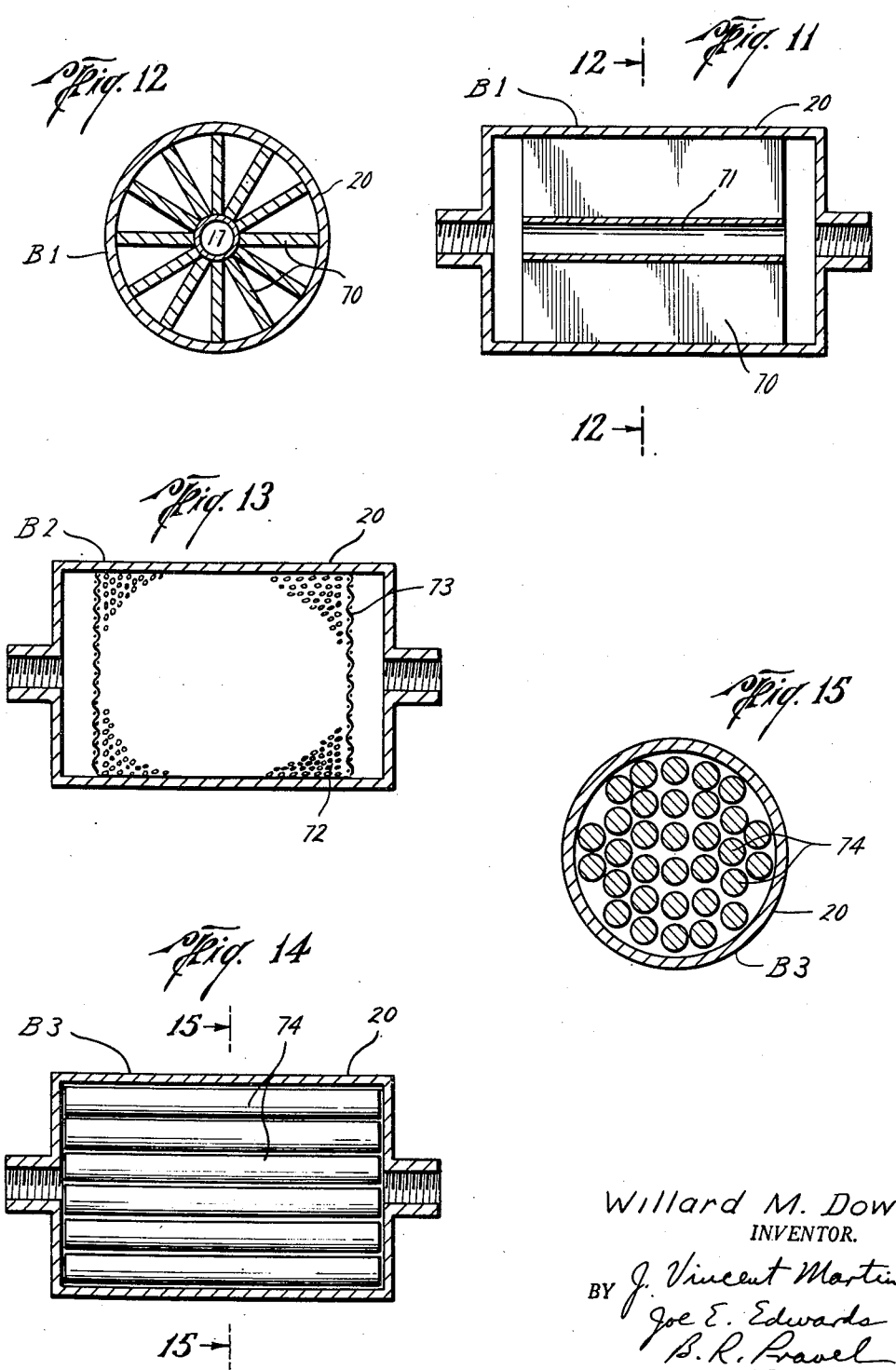

United States Patent Office 2,790,505
Patented Apr. 30, 1957

2,790,505

METHODS OF AND MEANS FOR DEHYDRATING AND PROCESSING FLUID STREAMS

Willard M. Dow, Shreveport, La., assignor to United Gas Corporation, Shreveport, La., a corporation of Delaware Application August 2, 1954, Serial No. 447,154

20 Claims. (Cl. 183—4.3)

This invention relates to new and useful improvements in methods of and means for dehydrating and processing fluid streams.

The invention is particularly adapted for use in dehydrating natural gas or gas streams flowing from high pressure gas-condensate or "distillate" wells. As used herein, the term "gas stream" is intended to include a stream which is primarily gaseous but which may contain hydrocarbon liquids and water in either or both the liquid or vapor phase.

In the usual dehydrating method or apparatus which employs a dry adsorbent or desiccant for adsorbing the moisture from a gas stream, it is usual practice to provide two separate bodies or beds of desiccant material so that one bed is employed in the dehydrating or drying cycle while the second bed is undergoing regeneration. The regeneration is normally carried out by directing a heated regeneration stream, usually gas, through the saturated desiccant bed or pack and after its passage through the bed, said heated stream has been cooled by directing said stream in heat exchange relationship with a cooling medium. Such heat exchange step involves extracting the heat from the regenerating gas stream and removing it from the system and this requires the provision of a coolant together with the necessary piping and valves; further, where the heat of regeneration is entirely removed from the system a more expensive operation results.

It is, therefore, one object of this invention to provide an improved method and apparatus for dehydrating and processing fluid streams wherein the conventional heat exchanger means which cools the regeneration stream by transferring the heat of regeneration to an external medium outside of the system is entirely eliminated and in place thereof a heat storage arrangement is incorporated within the system for properly controlling the movement of the heat of regeneration within the system itself, whereby said heat of regeneration does not adversely affect the dehydration operation.

An important object is to provide an improved method and apparatus, of the character described, having incorporated therein a heat storage unit which functions to effectively control the movement and transfer of the heat of regeneration in such manner that the heat load does not in any way interfere with or impede the dehydration operation; said unit obviating the necessity of transferring the heat of regeneration to an external medium, whereby efficient operation is effected with simplified equipment and at reduced cost.

A particular object is to provide an improved method and apparatus which is applicable to the usual double desiccant tower arrangement which is now in general use; the invention including means for efficiently extracting heat from the regeneration gas which has passed through one desiccant tower on the regeneration cycle and for retaining said heat so that it will not interfere with the dehydration operation which is occurring simultaneously in the other desiccant tower, the retained heat being thereafter dissipated by contact with the gas stream when flow through the towers is switched and said gas stream is subsequently directed through that tower which was previously regenerated and which, upon switching of flow, is placed on a dehydration cycle.

Another object is to provide an improved apparatus, of the character described, having a heat storage unit which is so positioned with respect to the desiccant bed with which it is associated that said unit extracts heat from the regeneration stream and retains the same until the succeeding dehydration cycle through the bed at which time the retained heat is given up to the incoming gas stream flowing therethrough and passing to the desiccant bed for dehydration, whereby the heat of regeneration is never transferred to an external medium outside of the apparatus but is effectively controlled within the system.

Still another object is to provide an improved heat storage unit which consists of a mass of heat storage material, which may be of any desired form, such as plates, bars, rods or the like mounted within a suitable vessel or container.

A further object is to provide an improved apparatus including a heat storage unit which is combined with an improved type of desiccant bed, wherein the flow of regeneration gas after passing through the bed is directed into contact with the vessel wall, whereby some of the heat of regeneration may be partially dissipated to atmosphere prior to its passage through the heat storage unit to thereby lessen the heat load on said unit.

Another object is to provide an improved desiccant bed construction for dehydration apparatus wherein the desiccant bed is mounted axially within a vessel with an annular flow space between the bed and vessel wall, together with means for directing the heated regeneration gas axially through the bed and then longitudinally through the annular flow space, whereby the regeneration gas is contacted with the vessel wall to effect some cooling thereof; said bed being preferably insulated from the vessel wall to increase the efficiency of heat transfer in the desired manner.

Still another object is to provide an improved heat storage unit and desiccant bed arrangement which lends itself to use with a dehydration apparatus wherein the desiccant bed chambers are incorporated within a single unitary apparatus and are in constant communication with each other throughout both dehydrating and regeneration cycles; such apparatus being extremely simple in construction and operable under high pressures which makes it adaptable for use on an individual well, whereby separation of the liquids and liquifiable fractions and dehydration of the gas stream may be accomplished prior to the passage of the gas through extended pipe lines to thereby eliminate the adverse effects of the unprocessed well stream upon said lines.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a vertical, sectional view of an apparatus, constructed in accordance with the invention for carrying out the improved method.

Figure 2 is a transverse, sectional view, taken on the line 2—2 of Figure 1.

Figure 3 is a transverse, sectional view, taken on the line 3—3 of Figure 1.

Figure 4 is a schematic diagram illustrating the invention applied to the usual double desiccant tower dehydrating apparatus.

Figure 5 is a view similar to Figure 1, illustrating the heat storage unit mounted within the same vessel as the desiccant bed.

Figure 6 is a view, also similar to Figure 1, of a modified form of desiccant bed.

Figure 7 is a horizontal, cross-sectional view, taken on the line 7—7 of Figure 6.

Figure 8 is an elevation, illustrating the invention applied to a dehydrating apparatus wherein the desiccant beds are mounted in a unitary assembly with the chambers in which said beds are disposed being in constant communication with each other.

Figure 9 is a longitudinal sectional view of the apparatus shown in Figure 8.

Figure 10 is a partial sectional view of the invention wherein the axis of the desiccant bed is located in a horizontal plane.

Figure 11 is a longitudinal, sectional view of a modified form of heat storage unit.

Figure 12 is a transverse, sectional view, taken on the line 12—12 of Figure 11.

Figure 13 is a view, similar to Figure 11, of another form of heat storage unit.

Figure 14 is a view, similar to Figure 11, of still another form of heat storage unit.

Figure 15 is a transverse, sectional view, taken on the line 15—15 of Figure 14.

In the drawings, the letter A designates an adsorbent or desiccant tower which may be of any desired construction. The tower is illustrated as including a cylindrical vessel 10 having its ends closed by suitable closures 11 and 12. An inlet pipe 13 extends into the lower portion of the vessel, while an outlet pipe 14 extends from its upper end. An annular shell 15 is disposed axially within the vessel and contains a suitable desiccant material C which is suitably supported upon a screen or perforated plate 16. Insulating material 17 insulates the shell 15 from the vessel wall.

A main gas stream which is to be dehydrated or otherwise processed is adapted to be introduced through inlet 13 so as to flow upwardly through the desiccant material C which forms a bed or pack; in passing through the desiccant pack the liquid fractions are adsorbed, and the dry gas escapes through the outlet line 14 which has a suitable control valve 14a connected therein. After the desiccant pack or bed is saturated, it is necessary to regenerate the same, and, to carry out this regeneration cycle, the main gas stream is shut off, and a hot regeneration gas stream is circulated downwardly from outlet pipe 14 through the desiccant pack or bed. The heated regeneration stream picks up the moisture in the desiccant material C to regenerate the bed, and the regeneration stream is then directed outwardly through what is normally the inlet pipe 13. For the purpose of withdrawing any liquids which may accumulate in the lower portion of the vessel 10, said vessel may be provided with a discharge line 18 controlled by a suitable valve 19.

In carrying out the present invention, a heat storage unit B is adapted to be combined with the desiccant tower 10, and, as shown in Figure 1, this unit comprises a vessel or casing 20 having a mass of heat storage material therein. The heat storage material is illustrated as comprising a plurality of metallic plates 21 and 22, which are arranged in alternate relationship within the interior of the casing 20. The tower inlet pipe 13 is connected to one end of the casing, while the opposite end of said casing has connection with an inlet conductor 23. When the desiccant tower is on the adsorbing or dehydrating cycle, the main gas flow enters through conductor 23, passes through the heat storage unit B and then through inlet 13 to the lower end of vessel 10 from where it passes upwardly through the desiccant pack. Thus, on the adsorbing or dehydrating cycle the unit B is located upstream of the desiccant pack C. During the regeneration cycle the hot regeneration gas passes through the pack C and then flows through the unit B, escaping outwardly through conductor 23 because during regeneration the flow through the apparatus is reversed. It is, therefore, evident that during the regeneration cycle the heat storage unit B is disposed downstream of the desiccant pack.

The unit B may take any form, but, as shown in Figure 1, it comprises the alternately arranged metallic plates 21 and 22. The plate 21 is preferably circular to fit the internal diameter of the casing 20 and has its peripheral portion in contact with and secured to the vessel wall. Each plate 21 has a central opening 21b which forms a flow opening and is also provided with a radial slot 21a adjacent the bottom of the casing for permitting a flow of liquid. Each plate 22 (Figure 3) is generally square in shape, so that a plurality of flow spaces 24 are formed between portions of the periphery of the plate and the wall of the vessel. It is preferable that the plates 21 and 22 be in direct contact with the casing 20 of unit B to encourage heat transfer therebetween, although such arrangement is not essential and said plates could be secured in position by straps or other supports. The plates 21 and 22 are arranged alternately, and, due to their construction, the gas flowing through unit B must take a circuitous or undulating path which assures intimate contact between the gas and said plates. Any condensation which occurs within the vessel 20 will precipitate downwardly into the lower portion of the casing 20 and my by-pass the plates 21 through the slots 21a to reach a withdrawal pipe 25 which is controlled by a suitable valve 26. The heat storage unit B functions to extract and retain heat and will function efficiently to control the movement and transfer of the heat of regeneration in such manner that the adsorbing or dehydrating operation is not interfered with. The inclusion of the unit B in an adsorbing apparatus eliminates the need for any heat exchanger device which would transfer the heat to some external cooling medium outside of the apparatus. The device is extremely simple, and its size is subject to variation in accordance with the particular temperature conditions of the gas flowing therethrough.

In operation, assuming that the desiccant tower 10 is on a regenerating cycle, a hot regeneration gas stream is directed downwardly through the desiccant pack C, the regeneration gas entering through pipe 14 and escaping through pipe 13. As the regeneration gas flows through the desiccant pack C, it picks up the moisture and functions to regenerate the desiccant material in the usual manner. The hot regeneration stream then enters the casing 20 and intimately contacts the mass of heat absorbing material which is in the form of the plates 21 and 22. A transfer of heat from the gas stream to the plates 21 and 22 is effected, which results in extracting the heat from the hot regeneration gas; also, the regeneration stream is cooled to cause condensation of the liquids in said stream, which liquids precipitate downwardly and may be withdrawn through pipe 25. Because the plates are relatively thick and because said plates comprise a relatively large mass of material, the heat which is extracted from the regeneration gas stream will be retained by this mass of material. Of course, some of the heat will be dissipated to atmosphere through the casing 20, but this is a very small amount as compared to the whole, so that substantially all of the heat is retained.

Following regeneration of the desiccant pack C and upon the succeeding adsorbing or dehydrating cycle, the main gas stream is introduced through the conductor 23. Normally, this main gas stream has passed through a separator to remove all free liquids from the stream, and said stream enters the casing 20 to contact the plates therein. Upon contact the main gas stream picks up the heat which has been retained by the plates from the preceding regeneration cycle; this produces an abrupt rise in the temperature of the gas stream as it initially contacts the unit B. However, because the volume or mass of this main gas stream is relatively large, the abrupt increase in temperature is of very short duration because the unit B is rapidly cooled to the normal temperature of said main gas stream. It is noted that the momentary increase in temperature of the main gas stream occurs at the start of the dehydrating or adsorbing cycle when the adsorptive efficiency of the bed is at its highest level, and, therefore, said bed is well able to handle the momentary surge of hot gas. Of course, since the main gas stream rapidly returns to its normal temperature, the greater part of the adsorbing cycle is carried out under normal main gas stream temperature conditions. In addition, since no water or liquid, but only heat, is added to the main gas stream by the unit B, the total or over-all adsorptive capacity of the bed for each adsorbing cycle is not affected.

It is noted that the unit B functions to extract heat from the regeneration stream and retains that heat within the system until the subsequent adsorbing or dehydrating cycle. During such subsequent adsorbing cycle, the retained heat is picked up by the initial portion of the main gas stream so that the unit B is cooled and is in condition for the next regeneration cycle. Actually, the unit B functions to control the heat of regeneration and prevents this heat from interfering with the adsorbing or dehydrating operation. The use of this unit eliminates the requirement for a heat exchanger apparatus, which actually removes the heat of regeneration from the system to some medium outside of the apparatus.

The invention is applicable to the usual or ordinary dehydrating apparatus, and Figure 4 illustrates the same applied thereto. As shown in this figure, a second desiccant tower A' is employed in combination with the tower A. This second tower has a heat storage unit B' constructed in the same manner as unit B connected thereto. A separator 27, which may be of any desired construction, is connected to inlet conductor 23 and functions to remove the free liquids from the main gas stream. When the tower A is on the adsorbing cycle, the main gas stream flows through separator 27, heat storage unit B and desiccant tower A and escapes through outlet 14. At this time regeneration gas is introduced through line 28, which connects with line 14 of the tower A', and the regeneration gas is directed outwardly through conductor 23'. Thus, tower A' is on regeneration while tower A is on the adsorbing cycle.

When flow is switched, the main gas stream from conductor 23 and separator 27 is directed through line 23a to heat storage unit B' and tower A', so that tower A' is on the adsorbing or dehydrating cycle. At this time the various valves are switched to direct regeneration gas downwardly through tower A, through heat storage unit B and to gas outlet conductor 23'. It will be evident that during regeneration the heat storage unit B' extracted heat from the regeneration gas stream, but, upon the subsequent adsorbing or dehydrating cycle, this heat which was retained by the unit B' was transferred to the main gas stream and was thereby dissipated.

In Figures 1 to 4 the heat storage unit B is illustrated as comprising a separate device mounted in its own vessel or casing 20; however, the unit B, which consists of a mass of heat absorbing material, may be actually mounted in the desiccant tower itself, and in Figure 5 such a construction is shown. As illustrated in this figure, the desiccant pack C is mounted in the upper portion of the vessel 10a, and the plates 21 and 22 comprising the unit B are disposed in the lower portion of the vessel at a point above the inlet line 13a. It will be evident that the unit will function in an identical manner when mounted in the dessicant vessel because said unit is located downstream of the desiccant pack during the regeneration cycle and upstream of the pack during the adsorbing or dehydrating cycle.

In order to relieve the heat load on the unit B and to permit said unit to be made as small as possible, it may be preferable to rearrange the mounting of the desiccant pack within its vessel, and in Figure 6 such a modification is shown. In this instance the desiccant tower comprises a vessel 30 having its ends closed by closures 31 and 32. An annular shell 33 is mounted axially within the vessel and contains the desiccant material to form a desiccant bed C. The wall of the shell 33 carries suitable insulation 34, and an annular flow passage 35 is formed between the shell and the inner wall of the vessel 30. An inlet pipe 36 is connected in the vessel wall and communicates with the lower end of the annular space 35. The upper end of the annular space has communication through openings 37 in the upper end of the shell with the upper end of the desiccant pack, and the main gas flow is downwardly through the pack through a perforated supporting member 38 into the lower end of the vessel. Escape from the lower end of the vessel is through an outlet line 39. Thus, the main gas flow is through inlet 36, upwardly through the annular space 35, downwardly through the desiccant bed C and then outwardly through pipe 39.

For regenerating the bed, a regeneration gas inlet 40 is provided in the bottom of the vessel 30, and the regeneration gas will flow upwardly through the bed, then downwardly through the annular space 35 and in a reversed direction through inlet pipe 36. The heat storage unit B has connection with pipe 36, which extends into the vessel 30, and the opposite end of said unit is connected with the main inlet line 23.

In the operation of the form shown in Figure 6, assuming the apparatus to be on a regeneration cycle, the regeneration gas is introduced through inlet 40 and flows upwardly through desiccant bed C to pick up moisture from the desiccant material. Upon leaving the upper end of the desiccant bed, the flow of hot regeneration gas is downwardly through the confined annular space 35, so that the regeneration gas is maintained in substantially intimate contact with the wall of the vessel. Since the wall is uninsulated, a heat transfer will occur, and some of the heat of the regeneration gas stream will be dissipated to atmosphere. If desired, radial annular fins 41 may be formed on the exterior of the vessel 30, and these fins will encourage dissipation of heat to atmosphere. The contact of the hot regeneration stream with the vessel wall will partially cool the stream and will thus relieve the heat load on unit B. As the gas stream leaves the vessel through pipe 30, it will flow through unit B which, as above explained, will extract heat from said stream. This heat will be retained by the mass of heat absorbing material within unit B until the next succeeding operation when the main gas stream flows into vessel 30 upon the adsorbing and dehydrating operation.

The heat storage unit B lends itself to use in an adsorbing or dehydrating apparatus, wherein the desiccant packs are mounted in a unitary assembly and wherein the chambers in which said packs are located are in constant communication with each other. In Figures 8 and 9 the application of the invention to this type of apparatus is shown. A central vessel 50, which may be disposed with its axis in a horizontal plane, has a desiccant tower D connected to one end and a second desiccant tower D' connected to its opposite end. The towers D and D' are constructed in the manner of the tower shown in Figure 6 and include the vessel 30, desiccant pack C, annular flow space 35, inlet pipe 36, outlet 39 and gas regenerating inlet pipe 40. The horizontal vessel 50, as well as the desiccant towers D and D', are all preferably mounted on a common frame structure 51, so as to form a unitary assembly. The vessel 50 has a main gas stream inlet 52 which conducts the main gas stream into a separating chamber 53 formed at the central portion of the vessel. Below the separating chamber is a liquid leg 54 which receives free liquids separated in chamber 53. A float 55, which controls a valve 56 in a hydrocarbon outlet line 57, is disposed in the liquid leg and functions to discharge hydrocarbon liquids which accumulate in the leg. A similar float 58, which controls a valve 59 in a water outlet line 60, is also mounted within the depending leg 54 and controls the discharge of water therefrom. Between the separating chamber 53 and the desiccant tower D is located a coalescing pack 61, and between this pack and the end of vessel 53 are the plates 21 and 22 which form the heat storage unit B. A similar coalescing pack 62 and another heat storage unit B are located in the opposite end of the vessel between the separating chamber 53 and the tower D'.

In the operation of this form, and assuming desiccant tower D to be on the adsorbing cycle with tower D' on the regenerating cycle, the main gas stream enters through line 52 and strikes deflector 64 within the separating chamber 53 and is deflected, whereby free liquids entrained in the stream may precipitate. The main stream then flows through the coalescing pack 61, heat storage unit B and to the desiccant tower D, wherein an adsorbing or dehydrating operation is carried out. In its passage through the unit B this main stream will pick up the heat which has been retained in said unit from the preceding regeneration cycle, but, as pointed out, since there are no free liquids in the main stream, the transfer of heat from the unit B to the main stream will not materially affect the dehydrating operation; as explained, it will merely result in a momentary temperature rise of the main stream.

At the same time that the main gas stream is flowing through the tower D, a hot regeneration gas is introduced through conductor 40 of the tower D', and the desiccant pack is being regenerated. The hot regeneration gas flows downwardly through the annular space 35 adjacent the wall of the vessel, and some heat is dissipated to atmosphere through the wall and through the cooling fins 41, if such fins are employed. Thereafter, the hot gas flows through the unit B and in contacting the plates 21 and 22 thereof has its heat extracted by the mass of material comprising these plates, and condensation and separation of the liquids in said stream is effected. The regeneration stream then flows through coalescing pack 62 into the separating chamber 53 and admixes with the incoming main stream. The admixture of the main stream with the regeneration stream may, depending upon the relative temperature of the streams, function to further cool said stream so as to further condense and precipitate liquids therefrom. The length of the annular passage 35 of the desiccant tower, as well as the size of the unit B, are such that the regeneration stream is cooled and the liquids carried thereby are precipitated by the time the regeneration stream has reached the coalescing pack 61 and has moved into the second heat storage unit B with the main gas stream.

It is noted that the apparatus which is shown in Figures 8 and 9 provides a unitary structure wherein the desiccant towers are in constant communication with each other, and it is not necessary to provide a valve arrangement and control system which would cause alternate flow first through one tower and then through another in the manner of the usual apparatus such as shown in Figure 4. In this type of apparatus the regeneration gas is cooled to the point where it may be admixed with the main gas stream and removed from the apparatus along with the main gas stream and without interfering with the adsorbing or dehydrating operation.

Although it is preferable, it is not absolutely essential that the desiccant packs be disposed with their respective axes in a vertical plane, and in Figure 10 a modification of the apparatus illustrated in Figures 8 and 9 is shown. In such modified structure, a vessel 50a, similar to the vessel 50 of Figure 8, is provided, and has the central separating chamber with the heat storage units B on each side thereof. The vessel 50a is of sufficient length to permit the mounting of the desiccant packs C at each end of said vessel. Each pack may be so arranged that the flow of regenerating gas therethrough passes through an annular space 35a between the pack and the vessel wall before flowing to the adjacent heat storage unit. The operation of this form is the same as that shown in Figures 8 and 9, the only difference being that the desiccant packs are located with their axes in a horizontal instead of a vertical plane.

As has been noted, the unit B may consist of any mass of heat absorbing material and may take any one of a number of forms. In Figures 11 and 12 a modified form of unit B–1 is illustrated. In this form the circular plates are eliminated, and in place thereof radial plates 70 are employed. These plates extend longitudinally of the vessel 20 and are disposed in radial planes around a central conduit 71.

In Figure 13 a unit B–2 is shown as consisting of the casing 20 having a mass of metal or other heat storage material in the form of spherical elements 72 therein. The elements are retained by suitable screens or perforated metal 73. In Figures 14 and 15 a unit B–3 is shown as comprising the casing 20 having a plurality of longitudinal rods 74 disposed therein. In the units B–2 and B–3 the spaces which are formed between the spherical elements 72 or the cylindrical rods provide the flow area for the gas. So long as the mass of metal within the unit B is sufficient to extract the heat and to retain said heat until the next succeeding operation, the purposes of the present invention will be accomplished. In all forms of the invention the unit B is located downstream of the desiccant pack during the regeneration cycle.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. The method of separating by preferential adsorption selected components from a gaseous stream within an apparatus having a bed of adsorbent material therein, said method including, carrying out an adsorbing cycle by flowing a main gaseous stream into and through the bed to remove adsorbable components from the stream until the bed is saturated to a predetermined degree, then carrying out a regeneration cycle by directing a hot regenerating gas stream through the bed to regenerate the same, alternately continuing the adsorbing and regeneration cycles, and controlling the movement and transfer of the heat of regeneration by extracting the heat of regeneration from the regeneration stream after the gas has passed through the bed during a regeneration cycle, storing substantially all of said heat of regeneration in the line of flow of both the regenerating gas stream and the main gaseous stream, and thereafter upon the next succeeding adsorbing cycle transferring said stored heat to the main gaseous stream and removing it therewith to prevent said heat of regeneration from interfering with the adsorbing cycle.

2. The method as set forth in claim 1, wherein the flow of the main gaseous stream is in one direction through the bed and the flow of the regeneration stream through the bed is in an opposite direction.

3. The method as set forth in claim 1, wherein extraction of the heat from the regeneration stream is at a point downstream of the bed during the regeneration cycle and transfer of said heat to the main gaseous stream is at a point upstream of said bed during the adsorbing cycle.

4. The method as set forth in claim 1, together with the additional step of partially cooling the regeneration gas by dissipation to atmosphere prior to the extraction of heat therefrom.

5. The method of separating by preferential adsorption selected components from a gas stream within an apparatus having a bed of adsorbent material therein, said method including, flowing a main gas stream into and through the bed to remove adsorable components therefrom until said bed is saturated to a predetermined degree, then directing a heated regenerating stream through said bed to regenerate the same, extracting the heat or regeneration from the hot regeneration stream at a point downstream of the bed during the regeneration cycle and after its passage through the bed, retaining substantially all of said heat of regeneration at said point downstream of the bed, subsequently again flowing the main gas stream through said bed to remove adsorable components, and removing the retained heat by flowing said main gas stream past the point where said heat is retained prior to the passage of said main stream to the bed.

6. The method of separating by preferential adsorption selected components from a gas stream within an apparatus having a bed of adsorbent material therein, said method including, flowing a main gas stream in one direction through the bed to remove adsorbable components therefrom until said bed is saturated to a predetermined degree, then directing a hot regenerating stream through the bed in a direction opposite to the direction of flow of the main gas stream to regenerate the bed, extracting the heat of regeneration from the hot regeneration stream at a point downstream of the bed during the regeneration cycle and after its passage through the bed, retaining substantially all of said heat of regeneration at said point downstream of the bed, and thereafter removing said heat by contacting the same with the main gas stream flowing to the bed upon the next subsequent cycle of operation.

7. The method of separating by preferential adsorption selected components from a gas stream within an apparatus having a bed of adsorbent material therein, said method including, flowing a main gas stream in one direction through the bed to remove adsorbable components therefrom until said bed is saturated to a predetermined degree, then directing a hot regenerating stream through the bed in a direction opposite to the direction of flow of the main gas stream to regenerate the bed, cooling the hot regeneration stream to some extent after it has passed through the bed, thereafter extracting the major portion of the heat from the regeneration stream at a point downstream of the bed during the regeneration cycle, retaining said heat at said point downstream of the bed, and subsequently transferring said heat to the main stream by contacting the same with the main gas stream flowing to the bed upon the next subsequent cycle of operation.

8. The method of separating by preferential treatment selected components from a gas stream within an apparatus having two beds of adsorbent material therein, said method including, flowing a main gas stream through one of said adsorbent beds to remove adsorbable components therefrom until the bed is saturated to a predetermined degree, discharging the dry gas from the apparatus after it has passed through said bed, simultaneously directing a hot regeneration gas stream through the second adsorbent bed to regenerate the same, extracting the heat of regeneration from the regeneration gas stream at a point downstream of the bed during the regeneration cycle and after its passage through the bed, retaining the major portion of said heat of regeneration at said point downstream of the bed, subsequently flowing the main gas stream through said second regenerated bed, transferring the retained heat to said main gas stream prior to its passage to said second bed, simultaneously directing a hot regeneration gas stream through the first saturated bed, and extracting heat from said hot regenerating gas stream at a point downstream of said saturated bed during the regeneration cycle and after its passage through said bed to regenerate the same, and retaining the major portion of said extracted heat of regeneration at said point downstream of the first bed.

9. The method as set forth in claim 8, with the additional step of partially cooling the regeneration gas stream subsequent to its passage through the bed during the regeneration cycle and prior to the extraction of heat therefrom.

10. The method of separating by preferential adsorption selected components from a gas stream within an apparatus having a double desiccant pack therein, said method including, flowing a main gas stream into a separating chamber between said desiccant packs to remove liquids from the stream, conducting the stream through one of said packs to remove adsorbable components therefrom, discharging the dry gas from the apparatus after it has passed through the pack, simultaneously directing a hot regeneration gas stream through the second desiccant pack to regenerate said second pack, extracting the heat of regeneration from said hot regeneration stream after its passage through said second pack, retaining substantially all of said heat of regeneration at the point of extraction, thereafter admixing the regeneration gas stream with the incoming main stream within the separating chamber between the packs, removing the regeneration gas from the apparatus with the main gas stream, and subsequently directing the main gas stream through the regenerated second pack and past the point at which the extracted heat is retained, whereby said heat is transferred to said main gas stream.

11. The method as set forth in claim 10, together with the additional step of partially cooling the hot regeneration gas stream after its passage through the second pack and prior to the extraction of heat therefrom.

12. The method as set forth in claim 10, together with the additional steps of, directing a hot regeneration gas through the first pack to regenerate the same while the main gas stream is flowing through the second pack, extracting heat from the hot regeneration gas stream after its passage through the first pack, retaining substantially all of said heat of regeneration at the point of extraction, and transferring said heat to the main gas stream upon the subsequent flow of the main gas stream through the first pack.

13. The method as set forth in claim 10, together with the additional steps of, directing a hot regeneration gas through the first pack to regenerate the same while the main gas stream is flowing through the second pack, extracting heat from the hot regeneration gas stream after its passage through the first pack, retaining substantially all of said heat of regeneration at the point of extraction, and partially cooling the hot regeneration gas after it leaves its respective desiccant pack and prior to the extraction of heat therefrom.

14. An apparatus for separating by preferential adsorption selected components from a gas stream which includes, a vessel having an inlet and an outlet, a bed of adsorbent material within the vessel disposed between the inlet and outlet, means for directing a main gas stream into the vessel through the inlet whereby said main gas stream passes through the bed of adsorbent material in flowing to the outlet and is thereby subjected to an adsorbing operation, the flow of the main gas stream being halted when the bed of adsorbent material becomes saturated to a predetermined degree, means for thereafter directing a regeneration gas into the vessel so that said regeneration gas flows through the bed, and means for extracting the heat of regeneration from the regeneration gas stream after the latter has passed through the bed and for retaining the major portion of said heat of regeneration in the line of both the regeneration gas stream and the main gas stream, and means for directing the main gas stream past the point at which said heat is retained to transfer said heat to said main gas stream upon the succeeding adsorbing operation which follows the regeneration cycle.

15. An apparatus for separating by preferential adsorption selected components from a gas stream which includes, a vessel having an inlet and an outlet, a desiccant bed within the vessel between the inlet and the outlet, whereby flow may be directed through the desiccant bed, means for alternately conducting a main gas stream through the desiccant bed until the bed is saturated to a predetermined degree to remove selected components from said stream in an adsorbing cycle and for conducting a regeneration gas stream through the bed to regenerate said bed in a regeneration cycle, the flow of the main gas stream being in one direction through the bed, while the flow of the regeneration gas stream is in an opposite direction through said bed, and a heat storage means located downstream of the bed during the regeneration cycle and upstream of the bed during the adsorbing cycle for extracting the heat of regeneration from the regeneration gas stream and for retaining substantially all of said heat of regeneration, and means for directing the main gas stream into contact with the means for retaining said heat upon the next succeeding adsorbing cycle, at which time said heat is transferred to said main gas stream.

16. An apparatus as set forth in claim 15, together with means disposed between the desiccant bed and the heat storage means for partially cooling the regeneration gas stream prior to its passage to said heat storage means.

17. An apparatus for separating by preferential adsorption selected components from a gas stream including, a unitary assembly including a vessel structure having an outlet at each end thereof and also having a main gas stream inlet intermediate each outlet end, a desiccant pack disposed between the inlet and each outlet end, means for selectively directing flow from the inlet through either one or the other of the desiccant packs to be discharged from the outlet end beyond said pack, means for conducting a heated regenerating gas into the assembly from the outlet end which is not functioning as a main gas stream outlet, whereby one desiccant pack may be undergoing regeneration while the other desiccant pack is adsorbing selected components from the main gas stream, and a heat storage unit disposed within the assembly between the inlet and each desiccant pack, said unit having means for extracting substantially all of the heat from the regeneration gas stream and for retaining said heat for an extended period of time, and means for transferring said retained heat to the main gas stream by direct contact with the main gas stream upon the next succeeding adsorbing cycle of the regenerated desiccant pack.

18. An apparatus for separating by preferential adsorption selected components from a gas stream including, a unitary assembly including a vessel structure having an outlet at each end thereof and also having a main gas stream inlet intermediate each outlet end, a desiccant pack disposed between the inlet and each outlet end, means for selectively directing flow from the inlet through either one or the other of the desiccant packs to be discharged from the outlet end beyond said pack, means for conducting a heated regenerating gas into the assembly from the outlet end which is not functioning as a main gas stream outlet, whereby one desiccant pack may be undergoing regeneration while the other desiccant pack is adsorbing selected components from the main gas stream, a heat storage unit disposed within the assembly between the inlet and each desiccant pack, said unit having means for extracting heat from the regeneration gas stream and for retaining said heat for an extended period of time, means for transferring said retained heat to the main gas stream by direct contact with the main gas stream upon the next succeeding adsorbing cycle of the regenerated desiccant pack, a liquid separating chamber within the assembly located between the desiccant packs and in communication with the inlet and with the heat storage units, whereby the incoming main gas stream is mixed with the regenerating gas stream after the latter has passed through the desiccant pack being regenerated and through the heat storage unit associated with said pack.

19. An apparatus as set forth in claim 18, together with a liquid accumulating chamber communicating with the liquid separating chamber for receiving liquids which precipitate downwardly in said separating chamber.

20. An apparatus as set forth in claim 15 wherein the desiccant bed is mounted axially within a shell with an annular flow space surrounding the bed, means for establishing communication between the annular flow space and the bed at only one extremity of the bed to cause the regeneration gas stream to pass entirely through the longitudinal length of the bed before it can enter said annular space, said annular space being defined by the wall of the shell which has its outer surface exposed to atmosphere so that some of the heat of regeneration is dissipated as the regeneration stream flows through said annular space.

References Cited in the file of this patent
UNITED STATES PATENTS

| | | |
|---|---|---|
| 1,186,067 | Becker | June 6, 1916 |
| 1,927,947 | Newell | Sept. 26, 1933 |
| 2,237,684 | Moore | Apr. 8, 1941 |
| 2,379,321 | Sutcliffe et al. | June 26, 1945 |
| 2,478,393 | Haarman | Aug. 9, 1949 |
| 2,661,808 | Kahle | Dec. 8, 1953 |
| 2,665,769 | Walker et al. | Jan. 12, 1954 |